United States Patent [19]

Kuhn et al.

[11] 4,022,866

[45] May 10, 1977

[54] RECOVERY OF METALS

[75] Inventors: Martin C. Kuhn; Nathaniel Arbiter, both of Tucson, Ariz.

[73] Assignee: The Anaconda Company, New York, N.Y.

[22] Filed: Apr. 17, 1975

[21] Appl. No.: 568,996

Related U.S. Application Data

[63] Continuation of Ser. No. 301,475, Oct. 27, 1972, abandoned, which is a continuation-in-part of Ser. Nos. 232,454, March 7, 1972, abandoned, Ser. No. 242,340, April 10, 1972, abandoned, and Ser. No. 265,709, June 28, 1972, abandoned.

[52] U.S. Cl. .................................. 423/26; 75/103; 423/32; 423/109; 423/150
[51] Int. Cl.$^2$ ...................... B03D 1/00; C01G 3/00; C01G 5/00; C22B 11/00
[58] Field of Search ................ 75/2, 103, 109, 117, 75/120; 423/32, 33, 26, 109, 150; 209/162, 163, 164, 165, 166 CU, 167

[56] References Cited

UNITED STATES PATENTS

| | | | |
|---|---|---|---|
| 2,695,843 | 11/1954 | Schaufelberger | 423/105 |
| 2,822,263 | 2/1958 | Forward et al. | 75/117 |
| 3,309,029 | 3/1967 | Frame | 241/20 |
| 3,386,572 | 6/1968 | Cadwell | 209/3 |
| 3,658,512 | 4/1972 | Blytas | 75/103 |
| 3,701,421 | 10/1972 | Maxwell | 209/164 |
| 3,798,026 | 3/1974 | Milmer et al. | 75/104 |
| 3,853,981 | 12/1974 | Hadzeriga | 423/24 |

FOREIGN PATENTS OR APPLICATIONS

| | | |
|---|---|---|
| 492,486 | 1953 | Canada |
| 526,348 | 1956 | Canada |

OTHER PUBLICATIONS

CIM Bulletin–Feb. '74–Kuhn, Akbiter, & Kling–'-'Anaconda's Akbiter Process for Copper" pp. 62–73.

*Primary Examiner*—O. R. Vertiz
*Assistant Examiner*—Eugene T. Wheelock
*Attorney, Agent, or Firm*—Pennie & Edmonds

[57] ABSTRACT

Copper, zinc and nickel are recovered from sulfide concentrates prepared from ores of one or more such metals by subjecting such concentrate to a leaching operation which comprises slurrying the concentrate in an aqueous solution containing ammonium sulfate and free ammonia and vigorously agitating the slurry at 50 to 80° C. and below 10 psig. in the presence of free oxygen while vigorously recirculating said oxygen from above the surface of the slurry to a substantial depth below such surface. The resulting pregnant leach solution contains copper, zinc, and/or nickel in dissolved form complexed with ammonia and such solution is treated to recover the dissolved metal. The undissolved sulfidic residue from the leaching operation is subjected to a secondary flotation operation to produce a sulfide concentrate containing the metal values not dissolved in the leaching operation, and such concentrate is treated to recover such values, as by smelting or by releaching.

12 Claims, 3 Drawing Figures

RECOVERY OF METALS

RELATED APPLICATIONS

This is a continuation of application Ser. No. 301,475 filed Oct. 27, 1972, which itself was a continuation-in-part of U.S. applications Ser. No. 232,454, filed Mar. 7, 1972, Ser. No. 242,340, filed Apr. 10, 1972, and Ser. No. 265,709, filed June 28, 1972. All now abandoned.

BACKGROUND OF THE INVENTION

Conventional practice in the recovery of copper, zinc and nickel from their sulfidic ores involve subjecting the ores to a froth flotation operation to produce a concentrate of the valuable metal sulfides and to reject in the flotation tailings valueless sulfides and the silicates, aluminates, and other valueless earthy material. The concentrates are treated in various ways, depending on the metal values present. Commonly copper and nickel flotation concentrates are smelted to produce copper and nickel metal, and zinc flotation concentrates are roasted to oxide and are either reduced with carbon (coke) or are leached with acid and reduced to metal by electrowinning.

Only occasionally has it been proposed to leach sulfide concentrates directly to produce a leach solution from which the metal value can be recovered, either by direct chemical reduction or electrolytically. One such procedure, proposed in the Forward U. S. Pat. Nos. 2,576,314, 2,726,934 and 2,822,263, involves leaching nickel or copper concentrates with ammonia in the presence of air in an autoclave at high temperature and pressure. The resulting copper or nickel bearing leach solution is treated in an autoclave at high temperature and pressure with hydrogen or carbon monoxide to precipitate the nickel or copper in finely divided metal form. The Forward process has been used successfully for treating relatively high-value nickel concentrates, but has not been economically satisfactory for treating copper concentrates.

In our aforementioned co-pending applications we have described an improved process for leaching copper, nickel and zinc concentrates with an aqueous ammoniacal solution at relatively low temperatures and at pressures near atmospheric. The metal values of the leach solution are recovered by liquid ion exchange followed by electrolysis, or in any other suitable manner.

It has also been proposed to treat copper concentrates with strong (near 100%) sulfuric acid to convert the metal sulfides to sulfates, with some release of elemental sulfur. Copper in concentrates thus treated is recovered in an acid copper sulfate solution, from which it may be extracted by any of various known means. While this procedure is technically feasible, it has not thus far proved to be commercially practicable.

Except as described above, all commercial processes of which we are aware for recovery of metal values from flotation concentrates by leaching have involved roasting the concentrates to oxides (with consequent evolution of major amounts of sulfur dioxide) and leaching the resulting roasted calcine with sulfuric or other acid. Except in the treatment of zinc concentrates preparatory to electrowinning the zinc, this procedure has not been found to possess commercial advantage over conventional sulfide smelting techniques.

STATEMENT OF THE INVENTION

The present invention is directed to a modification of the procedure described in our aforementioned U.S. patent applications for leaching sulfide mineral concentrates of copper, zinc or nickel at or near atmospheric pressures so that all the difficulties and expenses of high pressure or autoclave operations are avoided and at only moderately elevated temperatures with aqueous ammonia-ammonium sulfate solution in the presence of oxygen to produce a leach solution containing the metal value in dissolved form complexed with ammonia. In accordance with this invention, the solid residue of the leaching operation, after dissolution of some or most of the metal values of the original (primary) concentrates, is subjected to a secondary froth flotation operation to produce a secondary concentrate of the sulfide mineral values which have passed undissolved through the leaching operation. In this manner relatively valueless undissolved sulfides and other minerals may be rejected in the secondary flotation tailings, and a secondary concentrate of improved quality and reduced tonnage which is eminently suited for further treatment is produced. This secondary concentrate, depending on the nature of the original or primary concentrate, may be treated by smelting, by releaching or by any other desired technique. Whatever the chosen method of treatment, it is generally of improved quality for such treatment as compared with the primary concentrate; and its bulk relative to the primary concentrate is so much reduced as to require only relatively small treatment plant facilities.

Accordingly, the invention provides, in a process for recovering a metal of the group consisting of copper, zinc and nickel from an ore containing such metal in the form of a sulfide mineral, wherein the ore is treated by froth flotation to produce a primary sulfidic concentrate of said metal, the improvement which comprises the steps of (a) subjecting such primary concentrate to a leaching operation by slurrying it in an aqueous solution containing ammonium sulfate and free ammonia and vigorously agitating the resulting slurry at a temperature in the range from 50° to 80° C. and at a pressure not exceeding 10 psig. in the presence of free oxygen while vigorously recirculating said oxygen from above the surface of said slurry to a substantial distance below such surface, (b) withdrawing from the leaching operation slurry containing said metal in dissolved form complexed with ammonia in the aqueous phase and mineral matter containing sulfides in the solid phase and separating the aqueous solution from the undissolved solids, (c) treating said solution for the recovery of said metal, (d) subjecting the separated undissolved solids to a secondary flotation concentration operation to produce a secondary sulfide concentrate containing metal values which have passed through the leaching operation undissolved, and (e) treating said secondary concentrate for the recovery of metal values contained therein.

The undissolved solids withdrawn from the leaching operation, preparatory to subjecting them to the secondary froth flotation operation, should be washed free of most of the ammonical leach solution, for example by filtering and washing, or by subjecting the slurry to countercurrent decantation washing by which the solids are thickened and washed and the leach solution is decanted from them in a continuous operation. The washed and filtered or thickened solids pass to the secondary flotation operation and the wash liquor is advantageously united with the leach solution for treatment to recover the dissolved metal values.

The solids from the leaching operation may be releached either before or after being concentrated by means of the secondary flotation operation. For example, if it is desired to recover substantially all of a soluble metal values (e.g. copper) from the primary concentrates and then to recover a substantially insoluble metal sulfide value (e.g. molybdenite) in the secondary concentrate, it may be desirable to subject the solids residue from the leaching operation, after separation (say by decantation) of the primary leach solution, to a secondary leaching operation to largely complete the dissolution of the soluble sulfides before washing, thickening, and subjecting to the secondary flotation operation the insoluble residue of the leaching operations. Alternatively, if it is desired to insure substantially complete recovery of a soluble metal value by leaching and releaching while minimizing the bulk of material subjected to secondary leaching, the solids residue from a primary leaching operation may be thickened, washed and subjected to the secondary concentration operation, and the secondary concentrate (reduced notably in bulk by rejection in the tailings of relatively valueless materials such as pyrite) may then be releached in a secondary leaching operation to substantially complete the dissolution of the soluble metal sulfides.

The process of the invention may be used with particular advantage for the treatment of copper sulfide concentrates. Often such concentrates include a large proportion of particles of relatively valueless sulfides such as pyrite which are superficially coated with only a thin layer of a copper sulfide mineral. Such concentrates may be treated in accordance with the invention by subjecting them to the ammoniacal leaching operation to the extent necessary to dissolve such superficial coatings (and advantageously also copper sulfide minerals in slime components of the primary concentrates) but not to the extent necessary to dissolve very much of the relatively massive concentrate particles composed predominantly of copper sulfide minerals. At the conclusion of such a leaching operation, the solid residue is washed and thickened, and is then subjected to the secondary flotation operation to produce a concentrate largely freed of undesired pyrite and slimes. Such concentrate is generally of much less bulk and much higher quality than the primary concentrate. It may be treated by smelting or by releaching, as desired.

The process of the invention may be used with advantage also in the treatment of mixed concentrates, such as copper-nickel or copper-zinc sulfide concentrates. The copper content of the primary concentrate, especially that portion in the form of chalcocite and covellite, dissolves somewhat more readily than the common zinc and nickel sulfide minerals. Hence a primary leach solution which is enriched somewhat in copper relative to nickel or zinc (although containing both copper and nickel or zinc) may be produced; and the solid residue of the leaching operation after thickening and washing will yield in the secondary concentration operation a sulfide concentrate that is enriched somewhat in nickel or zinc and correspondingly depleted in copper relative to the primary concentrate. Such enrichment of the primary leach solution in copper, and of the secondary concentrate in zinc or nickel, while not necessarily great, may serve to facilitate separation of the metal value of the primary concentrate.

When the leach solution contains both copper and either nickel or zinc, treatment of such solution with a liquid ion exchanger may serve to extract the copper and leave the zinc or nickel in the raffinate, from which the latter values may be recovered separately from the ammonia and ammonium sulfate.

DESCRIPTION OF THE DRAWINGS

The accompanying drawings are flowsheets showing several alternative embodiments of the process of the invention as applied to a primary copper concentrate feed. Essentially the same sequence of procedures shown in these flowsheets may be applied to primary nickel and zinc concentrates also.

In the drawings.

EMBODIMENTS OF THE INVENTION

Figure 1:
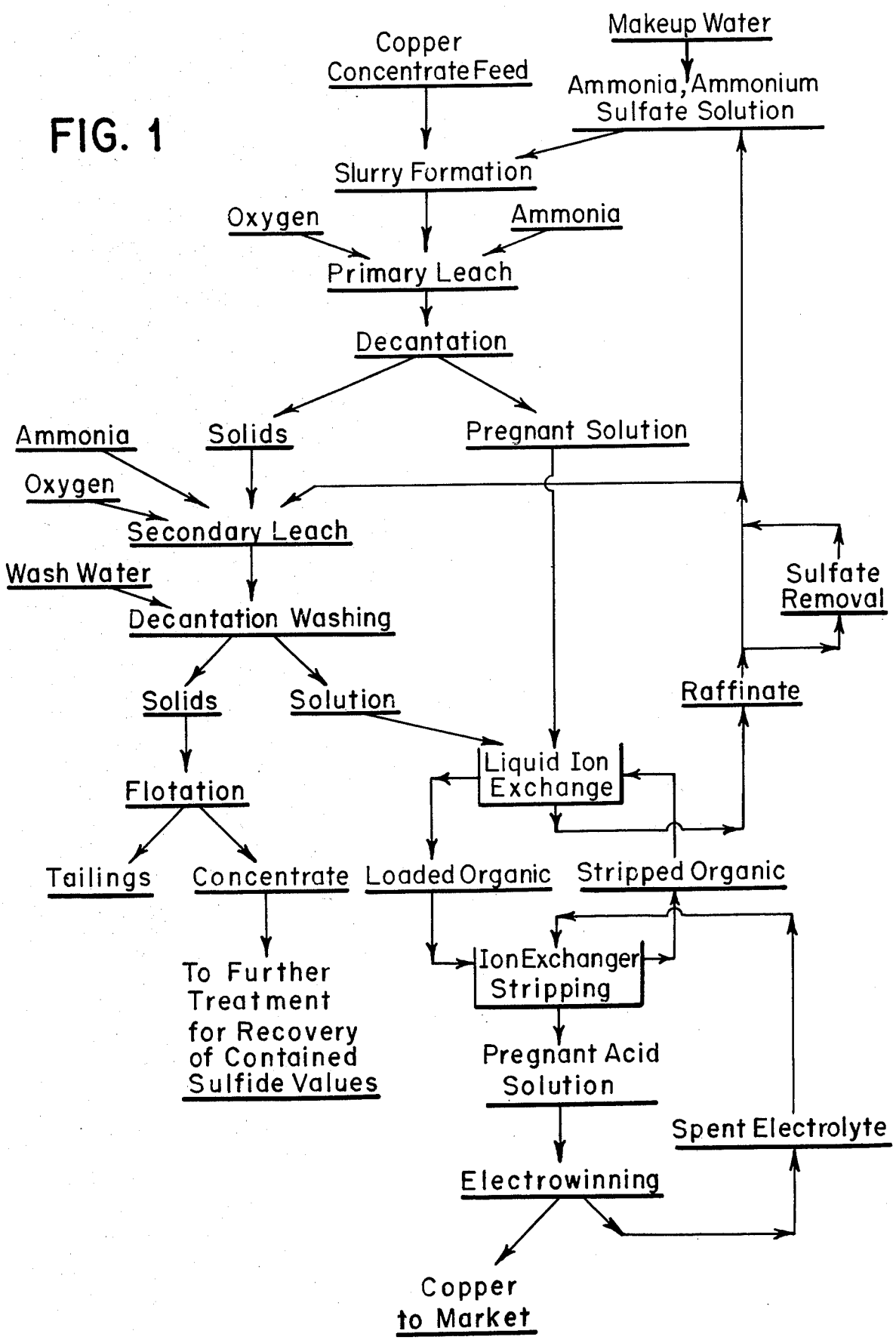
FIG. 1 is a flowsheet of an embodiment of the invention in which the secondary flotation operation is applied to the solid residue of a secondary leaching operation.

The flowsheet of FIG. 1 outlines an embodiment of the invention suitable for treating a primary copper concentrate containing as its metal values chiefly copper sulfide minerals (e.g. chalcocite, chalcopyrite, covellite, bornite, etc.) with minor amounts of precious metals such as silver and gold and a small amount of such other sulfide values as molybdenite and perhaps galena. The process of FIG. 1 contemplates that most (e.g. 95% or more) of the copper values will be recovered by leaching and a small fraction of the copper together with the other values will be recovered in the secondary flotation concentrate.

The primary concentrate is first formed into a slurry in recycled aqueous ammonium sulfate solution containing a small amount of free ammonia. The proportion of solids to liquid in the slurry is not critical, but may be in the range from 10 to 20% by weight solids, say 15%. Neither is the concentration of ammonia or ammonium sulfate critical in the slurry formation. Ammonium sulfate is produced in the course of the process, and ammonia is added during the leaching operation, whence whatever concentration of ammonium sulfate solution is available in the recycle liquor may be used to form the slurry.

The slurry is then delivered to the primary leaching operation, which is preferably carried out as described in our aforesaid application Ser. No. 232,454. This involves passing the slurry through a series of separate closed leaching tanks in each of which the pressure is below 10 psig. (and preferably below 8 psig.) and the temperature is in the range from 50° C. to 80° C. The temperature is near the lower limit of this range in the first tank in the series, and increases a few °C. in each succeeding tank. The slurry is vigorously agitated with a vigor input of at least 0.05 horsepower per cubic foot, in each tank while admitting oxygen to each tank and while also admitting ammonia to at least the first or first few tanks in the series. The amount of ammonia admitted is correlated with the temperature of the slurry so that the combined water vapor and ammonia partial pressures are at least a few psi. (e.g. 5 to 8 psi.) below the total pressure — not exceeding 10 psig. — of the system. These few psi. of partial pressure are made up by the oxygen admitted. At the preferred temperatures, the amount of ammonia which may be fed into the system without exceeding the indicated limit corresponds to a pH of the slurry in the range from 9 to 11.

The leaching reaction proceeds rapidly and exothermically in the first tank or first several tanks of the series, and maintaining the requisite temperature may require cooling of the slurry by cooling coils or a cooling jacket fitted in or about the tank. In the last tank or last several tanks where leaching proceeds more slowly it is usually possible to rely for ammonia on that advanced in solution from preceding tanks, so that ammonia need not be added to the last several tanks in the series. Also, it may be necessary to add some heat to the slurry by way of heating coils or a heating jacket to maintain the desired temperature in these tanks.

Oxygen (preferably commercially pure oxygen) is added to all tanks in the series, and as noted above the temperature and ammonia content of the slurry in each tank is adjusted so that the combined partial pressures of ammonia, water vapor and inert gases are at least about 5 psi. below the total pressure of the system, so that there will be a partial pressure of at least about 5 psi. of oxygen in the atmosphere over the slurry in each tank.

The slurry in each tank is vigorously agitated, and also the oxygen in the atmosphere above the surface of the slurry in each tank is vigorously recirculated to a substantial depth below such surface. Such agitation and vigorous recirculation of the oxygen may both be accomplished by a suitable powerful sub-aeration impeller mounted in each leaching tank.

The primary leaching time may take 3 to 6 hours, typically 5 hours transit time for the slurry through a series of five leaching tanks. During this time most of the more readily soluble copper sulfide minerals (e.g. chalcocite and covellite) will dissolve and also at least some of the more difficultly soluble minerals (e.g. bornite, chalcopyrite and enargite). The copper enters solution as copper ammonium sulfate. An appreciable proportion of the more difficultly soluble copper minerals and substantially all the molybdenite and pyrite remain undissolved. Likewise any galena (lead sulfide) present remains in the residue as either galena or a transformation product.

At the conclusion of the primary leaching operation, the solids are largely separated from the pregnant leach solution by decantation in a thickener, and the pregnant solution passes to treatment for recovery of its dissolved copper content. The thickened solids after being reslurried with recycled ammonium sulfate solution pass to a secondary leaching operation which is carried out much in the same manner as the primary leach, but usually in a single closed leaching tank or perhaps a series of only two such tanks. Here the temperature is maintained above 65°, up to 80° C., (up to 90° C. if nickel or zinc concentrates are treated) and both ammonia and oxygen are admitted. Again, however, the ammonia concentration is kept low enough so that the sum of its partial pressure and that of the water vapor is at least several (say 5 to 8) psi below the total pressure in the system, which total pressure does not exceed 10 psig, and is preferably below 8 psig. Typically the time required for the secondary leach will be about six hours. As in the primary leach, the slurry in the secondary leaching tank (or tanks) is vigorously agitated, and oxygen is vigorously recirculated from the atmosphere above the surface of the slurry to a substantial distance below such slurry.

At the conclusion of the secondary leach most of the copper content of the original primary concentrate feed will have been dissolved, leaving undissolved only those essentially insoluble sulfides such as pyrite, molybdenite, galena or its insoluble reaction products, and perhaps 1 to 5% of the original copper content, the latter being mainly present in the form of difficultly soluble sulfides such as enargite. Any pyhrrotite originally present will also remain largely undissolved. And of course any such gangue minerals as silica and silicates of alumina and magnesia that may have been present in the primary concentrates remains undissolved.

The slurry discharge from the secondary leaching operation is subjected to countercurrent decantation washing to separate the solids from the leach solution and to form a thickened washed pulp of the undissolved solids. The secondary leach solution is united with the primary leach solution to recover its dissolved metal values, and the thickened washed solids pass to the secondary flotation operation.

Flotation of the solids is carried out using conventional flotation apparatus, reagents, and techniques for concentrating the metal sulfide values present and for rejecting sulfides of low value, such as pyrite. For example, the thickened pulp from the countercurrent decantation washing operation is diluted to a density suitable for flotation, and if it contains some copper sulfide minerals together with molybdenite (or galena, or both) it may be subjected to flotation using a xanthate collector to produce a secondary concentrate containing most of the molybdenite and copper (plus galena if present) and a tailing containing most of the pyrite, pyhrrotite, and gangue minerals. The latter are sent to a waste dump, and the secondary concentrate is treated to recover its metal values. If it contains such values as galena, it may be subjected to a further selective flotation operation to recover the galena in a separate concentrate, or such separation may be made in the course of the secondary flotation operation.

The bulk of the secondary concentrate will generally be very small relative to that of the primary concentrate, and its treatment is correspondingly simplified. If, for example, the primary concentrate contained say 30% copper and 0.1% molybdenum as molybdenite, the secondary concentrate typically will contain about 10% molybdenum and about 30% copper, making separation of the molybdenite from the copper by conventional molybdenite flotation with depression of the copper relatively easy. After separation of the molybdenite, the remainder of the secondary concentrate may be sent to a copper smelter for recovery of its copper content.

The united leach solution from the primary and secondary leaching operations are with advantage treated with a liquid ion exchanger which preferentially loads copper from an alkaline solution. Several such liquid ion exchangers are known and available commercially, and any may be used successfully. They are generally dissolved in an organic solvent and diluted with a water-immiscible organic diluent such as kerosene. The pregnant aqueous leach solution is agitated with the organic ion exchanger solution, usually in several successive extraction stages. The resulting aqueous substantially copper-free raffinate contains ammonium sulfate and residual ammonia and constitutes the recycle liquor used to form slurry with the primary concentrate. A side bleed stream from the raffinate recycle is treated to remove excess sulfate dissolved in the course of the leaching operation and to recover the ammonia combined with such sulfate. This may be done, for example, by precipitation of the sulfate as gypsum, with lime, and boiling the ammonia from the resulting residual solution.

The loaded organic phase form the liquid ion exchange operation passes to a stripping operation where the copper is displaced by means of a strong sulfuric acid solution (spent electrolyte from an ensuing electrowinning operation). The stripped copper-free organic phase then recycles to the liquid ion exchange operation, as is conventional.

The pregnant sulfuric acid solution, containing the copper stripped from the ion exchanger, passes to a conventional electrowinning operation. Here the copper is electrodeposited from the solution, using insoluble anodes, as copper cathodes suitable for melting and casting into standard copper shapes, or suitable for marketing as such. The spent electrolyte, replenished in acid as a result of the electrolytic cell reactions, recycles to the ion exchanger stripping operation, as described above.

Figure 2:
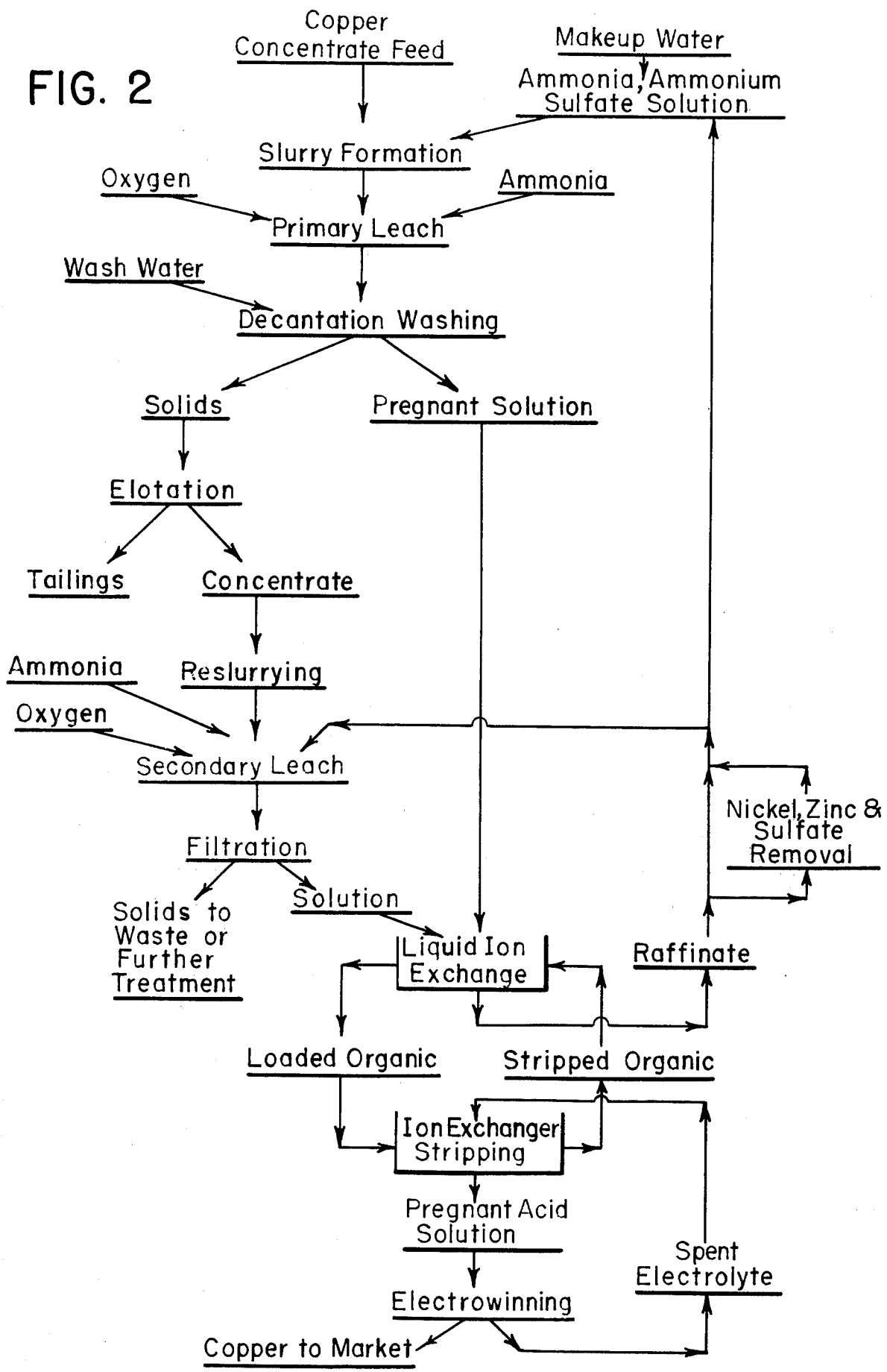
FIG. 2 is a flowsheet of an embodiment of the invention in which the secondary flotation operation is applied to the solid residue of a primary leaching operation and in which the secondary concentrate is releached to recover its sulfide metal values.

The flowsheet of FIG. 2 outlines an embodiment of the invention suitable for treating a primary copper concentrate which is of low grade and contains only copper sulfide minerals, or perhaps such minerals in association with zinc sulfide. The process of FIG. 2 contemplates utilizing the secondary flotation operation to simplify recovery of the metal values of the primary concentrate by a secondary leaching operation.

The primary concentrate feed, containing for example 20% copper, much of it in the form of slimes and superficial coating on pyrite particles, and perhaps 1% zinc (sphalerite) or a few percent nickel (pentlandite) is slurried as described above with recycle ammonia-ammonium sulfate liquor to produce a slurry containing say 15% solids.

The resulting slurry is passed to a primary leaching operation which, as described in connection with FIG. 1, may be conducted in a series of about five closed leaching tanks. Ammonia and commercially pure oxygen are added to the solution during leaching. The ammonia need be supplied to only the first one or two tanks in the series, but the oxygen is added to all of them. Temperatures and other conditions of leaching are as described in connection with FIG. 1, care being taken to insure that the temperature and free ammonia content in each tank is such that the sum of the partial pressures of ammonia, water vapor and inert gases is at least about 5 psi below the pressure established in the system by oxygen admission, so that the partial pressure of oxygen in each tank is substantially this value.

In a typical case about 80 to 90% of the copper and much of the zinc or nickel in the primary concentrate is dissolved during the primary leaching operation, with a solids weight loss of perhaps 50%. The discharge from the final leach tank passes to a countercurrent decantation washing system, when the pregnant leach solution separated and is washed from the solids, and the latter are collected as a thickened mud. The leach solution is passed to a liquid ion exchange operation to recover its dissolved metal values, and the solids after dilution to suitable flotation pulp density are passed to a flotation operation.

The flotation operation is carried out in conventional fashion to recover the metal sulfide values in a secondary concentrate and to reject in the tailings the gangue constituents and the valueless sulfides of the primary concentrates. Using conventional xanthate collectors and standard flotation conditioning, the residual copper sulfide minerals (mainly relatively difficultly soluble minerals such as enargite and chalcopyrite) and undissolved zinc sulfide minerals are substantially completely collected in a secondary concentrate containing say 25% copper. Pyrite free of surface coatings of valuable minerals, and residual gangue constituents from which adherent copper or zinc sulfides have been leached, are discharged to waste in the flotation tailings.

The bulk of the secondary flotation concentrates will be reduced to as little as 10 to 15% of the original feed concentrates, and to one third or less of the bulk of the solids discharged from the primary leach. This small volume of secondary concentrates, containing essentially all of the still undissolved copper, plus undissolved zinc values, is an ideal feed for a small secondary leaching operation, to which it is passed.

Because of the small volume of secondary concentrates, the secondary leach usually may be conducted in a single compact leaching tank. Leaching conditions are substantially as described above with reference to FIG. 1. The temperature is as high as or higher than during the last few stages of the primary leach, in order to favor substantially complete dissolution of the copper (and zinc or nickel) sulfides. The time of leaching may economically be as long as for the entire primary leach (5 or 6 hours) in view of the small volume of secondary concentrates.

At the conclusion of the secondary leach, the slurry from the leaching tank is filtered (and the filtered solids are washed if desired). Again, because of the small volume of solids remaining after the secondary leach (typically only about 40% of the secondary concentrates) only a small scale and consequently relatively simple filtration operations suffices to separate the solids from the leach solution. The latter is joined with the primary leach solution for treatment in the liquid ion exchange operation, and the filtered solids are discharged to waste, or, if they contain such recoverable values as precious metals, may be sent on to further treatment.

The treatment of the pregnant solution from the primary and secondary leaches by solvent ion exchange and electrowinning is in all essential respects the same as described above with reference to FIG. 1. The zinc or nickel dissolved during leaching remains in the raffinate from the liquid ion exchange and may be recovered from the bleed stream that is treated for removal of excess sulfate and recovery of ammonia. For example, after precipitation of the sulfate as gypsum, the zinc may be recovered coincidentally with boil-down of the residual solution to recover the ammonia.

Alternatively, zinc may be precipitated by treating the bleed stream with carbon dioxide under pressure (say at 10 to 50 psi) to precipitate a complex basic zinc carbonate which can be filtered or otherwise separated from the solution. The residual solution then may be subjected to gypsum precipitation with lime, followed by boiling to recover ammonia.

Nickel, when present, may be recovered by treating the entire raffinate or the bleed stream in a further ion exchange operation designed to extract nickel, after which the nickel-free raffinate is treated for removal of excess sulfate and for ammonia recovery. Nickel may also be recovered from the bleed stream after precipitation of excess sulfate as gypsum and coincidentally with boil-down of the solution to recover its ammonia content.

It is not necessary to recover all the zinc or nickel from the raffinate. If some substantial fraction of these values are recycled to the leaching operation, no harm is done thereby. It is only necessary to recover so much of the zinc or nickel as will avoid an excessive build-up of these metals in the leach solution.

Figure 3:
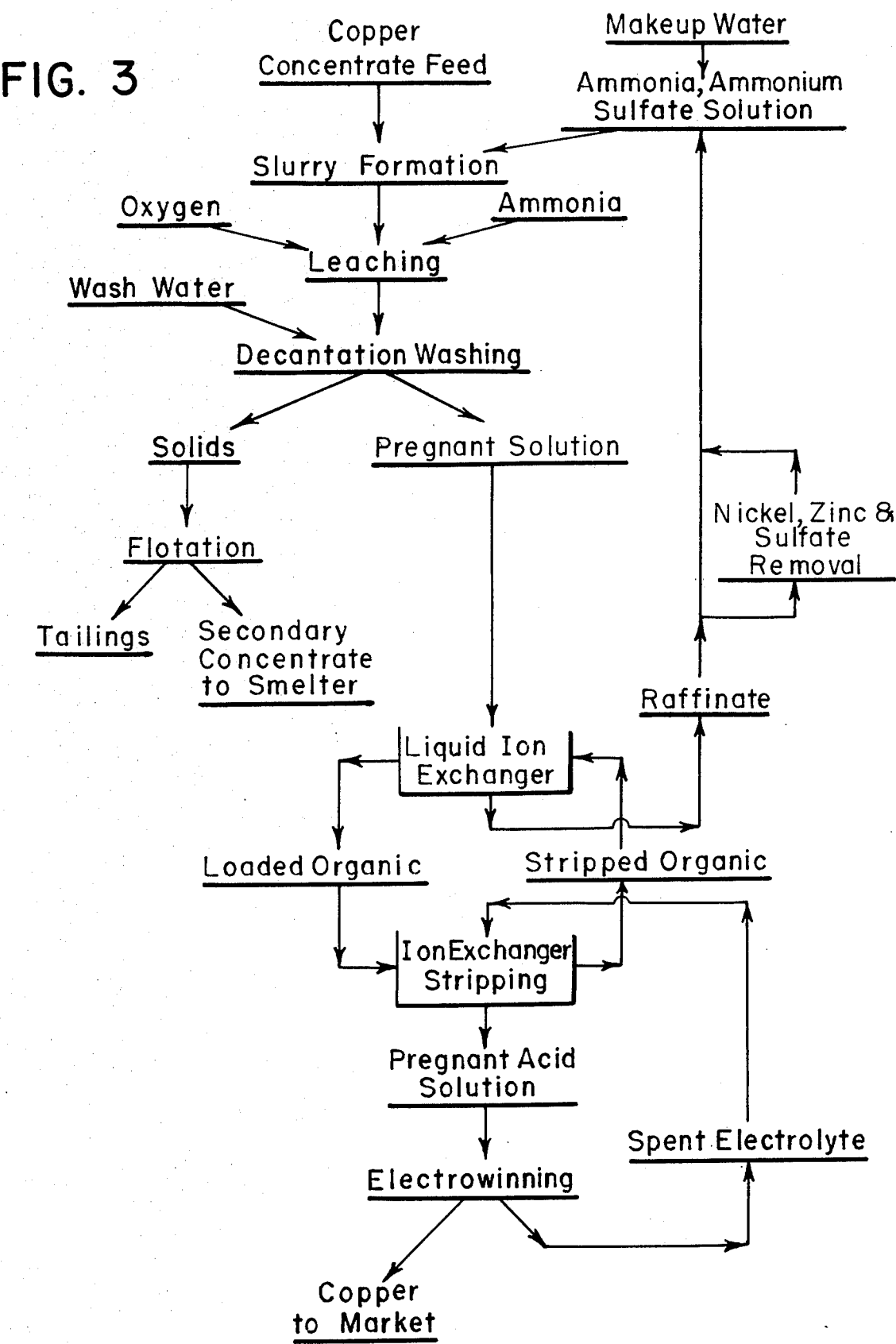
FIG. 3 is a flowsheet of an embodiment of the invention in which only a portion of the copper values are extracted from the primary concentrate by leaching and the solid residue of the leaching operation is treated in the secondary flotation operation to form an improved concentrate for smelting.

The flowsheet of FIG. 3 illustrates an embodiment of the invention which is well adapted to the treatment of low grade concentrates to improve such grade for smelting, or to increase the amount of concentrates that can be treated for copper recovery in a combination with an existing smelter without actually increasing the smelter capacity or the amount of its sulfur dioxide emission. The process of FIG. 3 contemplates using the secondary flotation operation to produce a high quality copper smelter feed while reducing the bulk of such feed, or to increasing the tonnage of primary concentrates treated without increasing the tonnage of smelter concentrate feed. Here again the primary concentrates may contain essentially only copper as the metal value to be recovered, or they may contain recoverable concentrations of zinc or nickel.

The primary concentrate feed is formed into a slurry with recycle ammonia-ammonium sulfate solution as described above. The resulting slurry then passes to a leaching operation which is conducted substantially as described above in connection with FIG. 1. The major difference is that in the process of FIG. 3 it is not contemplated that so high an extraction of copper and other soluble metal values into the leach solution will be achieved as in the processes of FIGS. 1 and 2. For example, it may be desired to recover only one-half or even less of the copper content of the primary concentrates in the leach solution. Consequently the number of leaching tanks in the series may be substantially reduced; and indeed a single leaching tank may in some cases suffice. Apart from this reduction in the amount of leaching equipment required, the conduct of the leaching operation is carried out substantially as described with reference to FIG. 1. Leaching temperatures may be held to near the low end of the specified range (50° to 80° C.) if a considerable amount of easily leached copper minerals are present in the primary concentrates. Leaching time also may be reduced approximately in proportion to the reduction in the number of leaching tanks. For example, a leaching time of 1 to 2 hours will usually suffice to dissolve up to 50% of the copper present in the primary concentrates.

At the conclusion of the leaching operation the slurry passes to a decantation washing operation where the pregnant leach solution is separated from the unleached solids, and the latter are collected as a washed thickened mud. The solution is passed on to treatment by liquid ion exchange for recovery of its copper content, and the thickened solids, after dilution to flotation density, are subjected to a flotation operation.

The flotation operation generally will be substantially the same as the operation by which the primary feed concentrates were produced. For example the collector may be a xanthate and the flotation pulp conditioning may be the same as used to produce the primary concentrates. The undissolved copper sulfide minerals will be collected in the secondary flotation concentrate (together with undissolved zinc or nickel minerals if present) and excess pyrite and gangue minerals which have been leached free of copper and other valuable sulfides during the leaching operation will be rejected in the tailings and sent to waste.

The tonnage of secondary concentrates will be significantly less than the tonnage of primary concentrates originally delivered to the leaching operation. Indeed, the reduction may be disproportionately greater than the proportion of copper minerals dissolved during leaching. Thus, if the primary concentrates comprise a substantial amount of pyrites superficially coated with copper sulfides, such pyrites will be largely freed of the copper mineral coating during the leaching operation and thus may be rejected in the tailings from the secondary flotation operation. Effects such as this, coupled with the reduction in volume of primary concentrate feed attendant upon leaching copper minerals from it, results in a large reduction in the tonnage of secondary concentrates compared with that of the primary concentrates — a reduction that may exceed proportionately the reduction due simply to dissolution of copper minerals.

If the primary concentrates contain a substantial amount of slimes, the quality of the secondary concentrates may be significantly improved as a result of dissolution of the copper mineral slimes during the leaching operation.

As a result, the secondary flotation concentrate is both reduced in bulk and may be improved in quality as a smelter feed material. Reduced smelter capacity is required to treat the secondary concentrates as compared with what would be required to treat the primary concentrates, whereby the tonnage of primary concentrates may be greatly increased without increasing smelter capacity; or alternatively a reduced smelter capacity will suffice to treat a given quantity of primary concentrates. Increased attention may be given to producing a high recovery of copper in the primary concentrates from the copper ore, even at the expense of lower grade primary concentrates, because the grade of concentrating for smelting may be increased during the secondary flotation operation.

The pregnant leach solution in the process of FIG. 3 is treated in the same manner as described above with reference to FIGS. 1 and 2. Nickel or zinc, if present in the primary concentrates, to the extent it is dissolved in the leach solution, may be recovered from the solvent ion exchange raffinate as described in connection with FIG. 2.

We claim:

1. The process for recovering a metal value of the group consisting of copper, zinc and nickel from a finely ground primary flotation concentrate containing one such metal value in the form of a sulfide mineral associated with iron sulfide, comprising slurrying said concentrate in an aqueous solution containing ammonium sulfate and free ammonia so proportioned as to maintain the pH of the slurry from about 9 to 11 and agitating the resulting slurry with a vigor input of at least 0.05 horsepower per cubic foot at a temperature in the range from 50° to 80° C. and at or near atmospheric pressure in the presence of free oxygen while recirculating said oxygen from above the surface of said slurry to a depth below such surface, the amount of ammonia utilized being correlated with the temperature so that the combined water vapor and ammonia partial pressures are at least a few psi below the total pressure of the system and the oxygen partial pressure makes up substantially the balance of the total pressure, terminating the leaching operation after most of said one such metal value has been dissolved but while an appreciable proportion of said one such metal value remains undissolved in the residual solids, withdrawing from the leaching operation slurry containing said one such metal value in dissolved form complexed with ammonia in the aqueous phase and mineral matter containing the undissolved portion of said one such metal value in the solid phase, separating the aqueous leach solution from the residual solids, and subjecting said residual solids to a secondary flotation concentration operation to produce a secondary sulfide concentrate substantially smaller in amount than the primary concentrate and containing said one such metal value which has passed through the leaching operation undissolved and to reject in the tailings of said secondary flotation operation iron sulfide of the primary concentrate which has been substantially freed by the leaching operation from said one such metal value.

2. The process of claim 1, wherein the undissolved solids separated from the leach solution are subjected to a counter-current decantation washing operation prior to being subjected to the secondary flotation concentration operation.

3. The process according to claim 2, wherein the wash liquor from the washing operation is united with the leach solution for treatment to recover the dissolved metal.

4. A process according to claim 1, wherein the undissolved solids after being separated from the leach solution and prior to the secondary flotation operation are subjected to releaching by being reslurried in aqueous ammonia-ammonium sulfate solution and by being agitated in such slurry at a temperature from 60° to 90° C. and at or near atmospheric pressure while recirculating free oxygen from above the surface of the slurry to a depth below such surface.

5. The process according to claim 1 wherein the secondary sulfide concentrate is formed into a slurry in aqueous ammonia-ammonium sulfate solution and is releached by agitating such slurry at a temperature from 60° to 90° C. and at or near atmospheric pressure while recirculating free oxygen from above the surface of the slurry to a depth below such surface.

6. The process according to claim 1, wherein the secondary sulfide concentrate is smelted to recover its metal values.

7. The process for recovering copper from a finely ground primary copper concentrate containing copper and iron in the form of sulfides, comprising slurrying said concentrate in an aqueous solution containing ammonium sulfate and free ammonia so proportioned as to maintain the pH of the slurry from about 9 to 11 and agitating the resulting slurry with a vigor input of at least 0.05 horsepower per cubic foot at a temperature in the range from 50° C. to 80° C. and at or near atmospheric pressure in the presence of free oxygen while recirculating said oxygen from above the surface of said slurry to a depth below such surface, the amount of ammonia utilized being correlated with the temperature so that the combined water vapor and ammonia partial pressures are at least a few psi below the total pressure of the system and the oxygen partial pressure makes up substantially the balance of the total pressure, terminating the leaching operation while an appreciable proportion up to about 50% of copper sulfide remains undissolved in the residual solids, withdrawing from the leaching operation slurry containing copper in dissolved form complexed with ammonia in the aqueous phase and mineral matter containing undissolved sulfides in the solid phase, separating the aqueous leach solution from the residual solids containing the remaining copper, subjecting said residual solids to a secondary flotation concentration operation to produce a secondary sulfide concentrate substantially smaller in amount than the primary concentrate containing copper which has passed through the leaching operation undissolved and to reject in the tailings of said secondary flotation operation iron sulfide of the primary concentrate which has been freed by the leaching operation from copper, and recovering from said secondary concentrate.

8. The process according to claim 7, wherein the aqueous leach solution is treated by a liquid ion exchanger dissolved in a liquid organic medium to extract the copper into the organic medium and to form an aqueous substantially copper-free raffinate containing ammonia and ammonium sulfate, the copper-loaded organic medium is treated with an aqueous sulfuric acid solution to recover the copper in the form of an acid copper sulfate solution and to regenerate the liquid ion exchanger, the raffinate is recycled for reuse in the leaching operations, and copper is electrowon from the acid copper sulfate solution.

9. The process according to claim 8 in which the primary concentrate contains zinc in addition to copper, and said zinc is dissolved in the leach solution and remains in the raffinate after liquid ion extraction of the copper, wherein at least a portion of the raffinate is treated to precipitate zinc as an insoluble compound therefrom, the precipitated zinc compound is separated from the residual solution, and the residual solution is treated for recovery of its ammonia content.

10. The process according to claim 9, wherein at least a portion of the raffinate is treated with carbon dioxide under pressure to precipitate zinc in the form of an insoluble carbonate compound.

11. The process according to claim 7, wherein the primary concentrate comprises a substantial proportion of pyrite particles superficially coated with a copper sulfide mineral, which comprises dissolving such coating in the leaching operation, thereby freeing the resulting pyrite particles of such cupriferous coating and rejecting said pyrites into the tailings of the secondary flotation operation.

12. The process for recovering copper from a finely ground primary copper concentrate containing copper and iron in the form of sulfides, comprising slurrying said concentrate in an aqueous solution containing ammonium sulfate and free ammonia and agitating the resulting slurry with a vigor input of at least 0.5 horsepower per cubic foot at a temperature in the range from 50° to 80° C. and at a pressure up to 10 psig in the presence of free oxygen while recirculating said oxygen from above the surface of said slurry to a depth below such surface, the amount of ammonia utilized being correlated with the temperature so that the combined water vapor and ammonia partial pressures are at least a few psi below the total pressure of the system and the oxygen partial pressure is at least about 5 psi of oxygen in the atmosphere over the slurry, terminating the leaching operation while an appreciable proportion up to about 50% of copper sulfide remains undissolved in the residual solids, withdrawing from the leaching operation slurry containing copper in dissolved form complexed with ammonia in the aqueous phase and mineral matter containing undissolved sulfides in the solid phase, separating the aqueous leach solution from the residual solids, subjecting said residual solids containing the remaining copper to a secondary flotation concentration operation to produce a secondary sulfide concentrate substantially smaller in amount than the primary concentrate containing copper which has passed through the leaching operation undissolved and to reject in the tailings of said secondary flotation operation iron sulfide of the primary concentrate which has been freed by the leaching operation from copper, and leaching said secondary sulfide concentrate to recover copper therefrom.

* * * * *

UNITED STATES PATENT AND TRADEMARK OFFICE
CERTIFICATE OF CORRECTION

PATENT NO. : 4,022,866
DATED : May 10, 1977
INVENTOR(S) : Martin C. Kuhn and Nathaniel Arbiter It is certified that error appears in the above-identified patent and that said Letters Patent are hereby corrected as shown below:

Column 10, line 51, "concentrating" should read --concentrates--

Column 12, line 24, "recovering from" should read --recovering copper from--

Column 12, line 64, "0.5" should read --0.05--

Signed and Sealed this second Day of August 1977

[SEAL]

Attest:

RUTH C. MASON
*Attesting Officer*

C. MARSHALL DANN
*Commissioner of Patents and Trademarks*